United States Patent [19]

Asanuma et al.

[11] Patent Number: 5,027,302

[45] Date of Patent: Jun. 25, 1991

[54] DEVICE FOR SWITCHING VEHICLE OPERATING CHARACTERISTICS

[75] Inventors: Nobuyoshi Asanuma; Shinnosuke Ishida; Hiroshi Hasegawa, all of Saitama, Japan

[73] Assignee: Honda Giken Kogyo Kabushiki Kaisha, Tokyo, Japan

[21] Appl. No.: 392,086

[22] Filed: Aug. 10, 1989

[30] Foreign Application Priority Data

Aug. 10, 1988 [JP] Japan ................................ 63-199612

[51] Int. Cl.5 ............................................. B60G 17/00
[52] U.S. Cl. .............................. 364/424.05; 364/449; 280/707
[58] Field of Search ..................... 364/424.01, 424.05, 364/443, 449; 280/707

[56] References Cited

U.S. PATENT DOCUMENTS

| | | | |
|---|---|---|---|
| 4,526,401 | 7/1985 | Kakizaki et al. | 280/707 |
| 4,789,935 | 12/1988 | Buma et al. | 364/424.05 |
| 4,827,416 | 5/1989 | Kawagoe et al. | 364/424.05 |
| 4,903,983 | 2/1990 | Fukushima et al. | 280/707 |
| 4,922,427 | 5/1990 | Yokote et al. | 364/424.05 |

*Primary Examiner*—Thomas G. Black
*Attorney, Agent, or Firm*—Lyon & Lyon

[57] ABSTRACT

A device for switching vehicle characteristics which includes means for setting information concerning a road, such as a highway, in the running path of the vehicle, means for detecting the fact that the vechicle comes to a designated road portion in the running path and for producing output information concerning said predetermined road portion and means for effecting switching of the vehicle characteristics in response to the output information concerning the road.

6 Claims, 2 Drawing Sheets

DEVICE FOR SWITCHING VEHICLE OPERATING CHARACTERISTICS

BACKGROUND OF THE INVENTION

1. Field of the Invention

The present invention relates to device for automatically switching vehicle characteristics, such a softness or hardness of a suspension system of the vehicle, sharpness or hardness of a steering system of the vehicle or the like, depending upon the state of a road on which the vehicle, such as an automobile, is running.

2. Description of the Prior Art

Recently, a vehicle has been developed in which a suspension system can be switched to soft or hard condition or a steering system can be switched to soft or hard condition, by a driver's manual selection of a change-over switch. In the vehicle of this type, the suspension system is set to its soft side and the steering system is set to its sharp side when the vehicle is running on a normal surface street, while the suspension system is set to its hard side and the steering system is set to its soft side when the vehicle is running on a high-speed highway, for example, so that the vehicle can be driven with optimum vehicle characteristics, depending upon a state of the road on which the vehicle is running.

In such a vehicle, a device for switching the vehicle characteristics is manually operated by a driver who selects a change-over switch, and such selection of the switching of the vehicle characteristics requires a complicated operation, because it is difficult to set the optimum vehicle characteristics, depending on the state of a road, by properly selecting a combination of a plurality of systems such as the suspension system, the steering system and the like.

SUMMARY OF THE INVENTION

It is a general object of this invention to avoid the disadvantages of the device for switching the vehicle characteristics according to the prior art.

It is a specific object of the present invention to provide a device for switching vehicle characteristics in which the state of a road on which the vehicle is currently running is detected, and the vehicle characteristics such as softness or hardness of a suspension system, sharpness or softness of a steering system or the like can be automatically switched depending upon the state of the road.

In accordance with the present invention there is provided a device for switching vehicle characteristics which comprises means for setting the road information concerning the kind of a road, such as a highway or the like, in the running path of the vehicle, means for detecting the kind of road on which the vehicle is running and for producing an output of predetermined road information in response to the detected kind of road and means for switching the vehicle characteristics, such as softness or hardness of the suspension system of the vehicle, sharpness or softness of the steering system of the vehicle or the like, in response to the output of the road information.

DESCRIPTION OF THE PREFERRED EMBODIMENT OF THE INVENTION

Now, a preferred embodiment of the present invention will be described with reference to the drawings.

Figure 1:
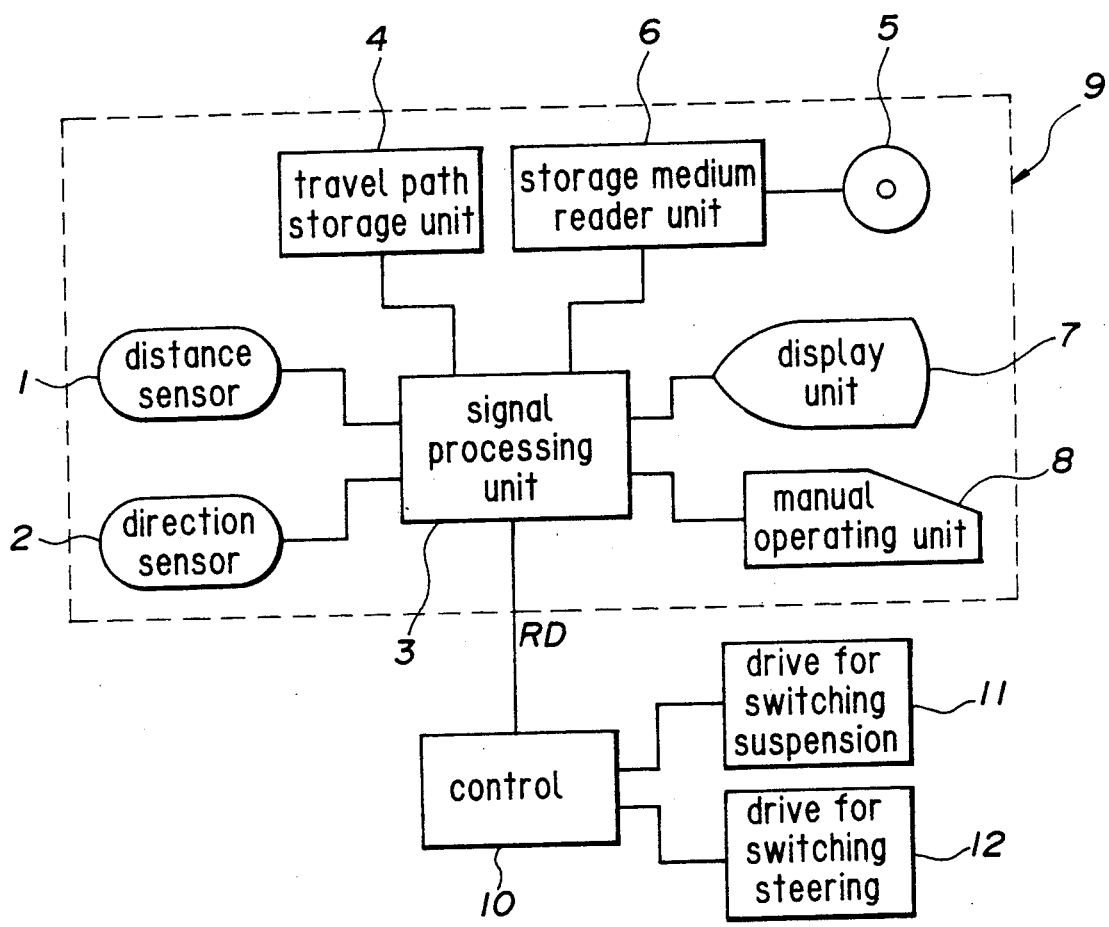
FIG. 1 is a block diagram showing the construction of an embodiment of the device for switching the vehicle characteristics according to the present invention.

The device for switching the vehicle characteristics according to the present invention shown in FIG. 1, comprises a navigation system part g which includes a distance detector 1 for measuring the running distance of the vehicle by counting the number of pulse signals which are generated in response to the rotation of a tire, for example, of the vehicle at every one unit as running distance; a direction detector 2 for detecting the azimuth or the amount of variation of the running direction of the vehicle which varies depending upon the running of the vehicle, said direction detector consisting of a geomagnetic sensor, a gyroscope or the like; a signal processing unit (computer control unit) 3 for receiving detection signals produced from said distance detector 1 and said direction detector 2 and for successively finding positions of the vehicle on X-Y coordinates by an arithmetic operation at every one unit of running distance of the vehicle and effecting a central control of a whole system, said signal processing unit consisting of a CPU, a programming ROM, a controlling RAM and the like; a travel path storage unit 4 for successively storing positional data concerning constantly changing positions of the vehicle on the X-Y coordinates found by said signal processing unit 3 and for holding said data as finite continuous positional information corresponding to the current positions of the vehicle; a map information storage medium 5 in which a plurality of previously digitized map information is stored in the form of file units; a storage medium reader unit 5 for selectively reading out the required map information from the storage medium; a display unit 7 for displaying a picture of a map on a picture plane in response to the map information read out by said reader unit and for constantly and renewedly displaying the current position of the vehicle, the running path to the current position, the current running direction and the like on the same picture plane of said display unit on the basis of the positional data stored in the travel path storage unit; and a manual operating unit 8 for feeding an instruction for operation to the signal processing unit 3 and for effecting proper operations, such as designation for selection of a map to be displayed on the display unit 7, setting of a starting point of the vehicle on the map displayed on the display unit, changing of the setting of a reducing scale rate of the displayed picture and rotation of the displayed picture. The device according to the present invention further comprises a drive 11 for switching the suspension system of the vehicle between a soft or hard condition, a drive 12 for switching the steering system of the vehicle between a soft or sharp condition, both on the basis of the road information RD produced by the signal processing unit 3 in the navigation system part 9, and a controller 10 for properly controlling the switching operation of the drive 11 and the drive 12.

Figure 2:
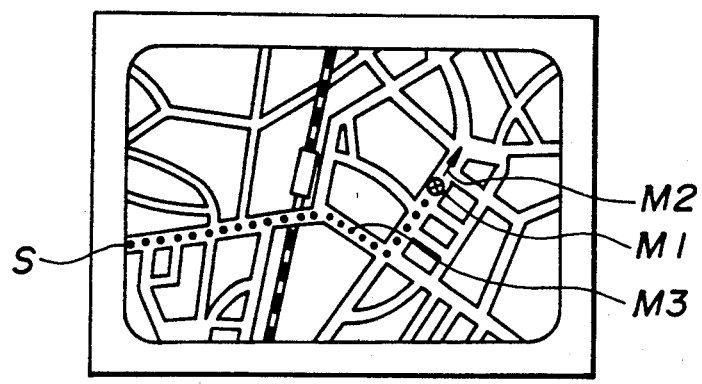
FIG. 2 shows an example of a picture shown on a display unit of the embodiment shown in FIG. 1.

In the navigation system part g, the selectively read out map is displayed on the picture plane of the display unit 7, as shown in FIG. 2. Furthermore, a mark M1 which indicates the current position of the vehicle which is decided on the X-Y coordinates, with the reduced scale of the map predetermined by the signal processing unit 3, on the basis of the travel of the vehicle from the starting point S set on the map, a mark M2 which indicates the running direction of the vehicle at the current position and a mark M3 which indicates the travel path from the staring point S to the current position are displayed on the same picture plane, in such manner that the travel path simulates the actual travel of the vehicle.

In the construction of the type as described above, the present, invention is characterized by designating the kind of a road, such as highway, surface street road, straight road, winding road or the like, on the expected travel path on the map displayed on the picture plane, by an input operation of the manual operating unit 8 under the control of the signal processing unit 3, previously inputting all of the information concerning the road, such as highway or the like, judging that the vehicle has come to the designated road on the expected travel path when the mark M1 indicating the current position of the vehicle displayed on the picture plane has come to a present position on the expected travel path, and then producing an output concerning the predetermined road information corresponding to the designated road judged as mentioned above.

Figure 3:
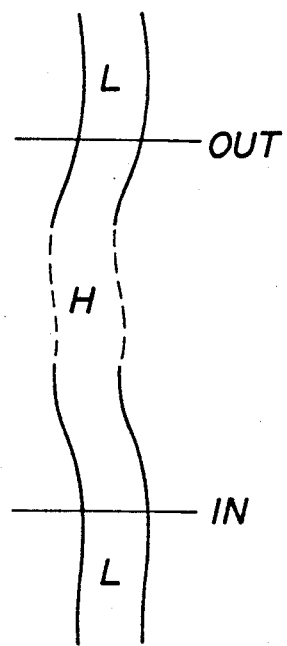
FIG. 3 is a diagram showing a positional relationship of a highway relative to a surface street.

At the time when the highway or the like on the expected travel path on the displayed map is designated and the information concerning the road, such as the highway or the like, is previously inputted, the position of an entrance IN of the highway H on the map displayed on the picture plane is set and the road information indicating the highway is inputted, for example. In the same manner, the position of an exit OUT of the highway is set, and road information indicating a surface street road is inputted. In FIG. 3, L indicates the usual road.

The signal processing unit 3 is so constructed that when the mark M1 indicating the current position of the vehicle comes to the preset position indicating the entrance IN of the highway H on the expected travel path on the map displayed on the picture plane, the road information RD concerning the highway which has been previously inputted at this position is fed to the controller 10.

Accordingly, the controller 10 acts to read out the fact that the vehicle has entered the highway, on the basis of the content of the road information RD at this moment and then acts to cause the respective switching control operations of the suspension system switching drive 11 and the steering system switching drive 12, thereby switching the suspension system of the vehicle to its hard condition and switching the steering system to its soft condition.

Furthermore, the signal processing unit 3 is so constructed that when the mark M1 indicating the current position of the vehicle comes to the present position indicating the exit OUT of the highway H on the expected travel path on the map displayed on the picture plane, the road information RD of the surface street road which has been inputted at this position is fed to the controller 10, in the same manner as in entering the highway.

Accordingly, the controller 10 acts to read out the fact that the vehicle entered the surface street road, on the basis of the content of the road information and then acts to cause the respective switching control operations of the suspension system switching drive 11 and the steering system switching drive 12, thereby switching the suspension system of the vehicle to its soft condition and switching the steering system to its sharp condition.

The device may be modified in the manner as hereinafter described. That is, in place of designating the highway or the like on the expected travel path, by the input operation of the manual operating unit 8 and inputting the road information RD concerning the designated highway or the like, as explained above, it is possible to cause the map information storage medium 5 to previously store the map information together with a position of the highway or the like on the map and the road information RD thereof and to feed the previously stored road information RD to the controller 10, depending upon a position of the mark M1, under the control of the signal processing unit 3, when the mark M1 indicating the current position of the vehicle has come to a predetermined position on the map displayed on the picture plane.

In the above description, the present invention was described, with reference to the switching of the suspension system and the steering system, but the present invention can be applied to switching of the number of valves of an engine that are to be operated or switching of the increasing or decreasing of the height of the vehicle.

As explained above, the present invention provides a device for switching vehicle characteristics which employs a navigation system for successively and renewedly displaying a current position of a vehicle on a map displayed on a picture plane as the vehicle proceeds, in which when the vehicle comes to a highway or the like, the predetermined road information, which has been previously registered, is read out, thereby detecting a state of the road on which the vehicle is presently running and the vehicle characteristics are switched depending on the detected state of the road, for example the steering system of the vehicle is switched between the soft or hard condition or the steering system of the vehicle is switched between the sharp or soft condition, according to the present control program. Thus, the present invention presents a superior advantage in that the setting of the optimum vehicle characteristics can be automatically effected, depending upon the state of the road, on the basis of combination of a plurality of systems, such as a suspension system, a steering system and the like.

We claim:

1. A device for switching operating characteristics of a vehicle, comprising:

means for storing road information concerning a kind of a road on a travel path of the vehicle;

means for detecting the kind of road on which the vehicle is running including a navigation system in which a position of the vehicle on X-Y coordinates is found by an arithmetic operation, while detecting a running distance and a running direction of the vehicle, and a current position of the vehicle is displayed on a road map having the same X-Y coordinates, means for producing an output of predetermined road information from said means for storing road information depending upon the detected kind of road at said current position of the vehicle displayed on the road map; and means for effecting switching of the vehicle operating characteristics in accordance with said output of predetermined road information.

2. A device for switching vehicle operating characteristics according to claim 1, in which the kind of the road includes a highway or a surface street road.

3. A device for switching vehicle operating characteristics according to claim 1, in which the kind of the road includes a straight road or a winding road.

4. A device for switching vehicle operating characteristics according to claim 1, in which switching of the vehicle characteristics is made on a suspension system of the vehicle which can switched between a soft or hard condition.

5. A device for switching vehicle operating characteristics according to claim 1, in which switching of the vehicle characteristics is made on a steering system which can be switched between a sharp or soft condition.

6. A device for switching vehicle operating characteristics according to claim 1, in which switching of the vehicle characteristics is made on a height of the vehicle which can be switched between a high or low height.

* * * * *